US010759072B2

(12) United States Patent
Rawlings et al.

(10) Patent No.: US 10,759,072 B2
(45) Date of Patent: Sep. 1, 2020

(54) BLADE ASSEMBLY AND METHOD OF MAKING CUT FOOD PRODUCTS

(71) Applicant: McCain Foods USA, Inc., Lisle, IL (US)

(72) Inventors: David M. Rawlings, Othello, WA (US); Michael S. Jacko, Wanatah, IN (US); Adam M. Rawlings, Othello, WA (US); Mary Perez, Othello, WA (US)

(73) Assignee: McCain Foods USA, Inc., Lisle, IL (US)

( * ) Notice: Subject to any disclaimer, the term of this patent is extended or adjusted under 35 U.S.C. 154(b) by 0 days.

(21) Appl. No.: 15/472,956

(22) Filed: Mar. 29, 2017

(65) Prior Publication Data

US 2017/0197323 A1    Jul. 13, 2017

Related U.S. Application Data

(62) Division of application No. 14/380,841, filed as application No. PCT/US2012/045058 on Jun. 29, 2012, now abandoned.

(51) Int. Cl.
*B26D 3/26* (2006.01)
*A23L 19/00* (2016.01)
(Continued)

(52) U.S. Cl.
CPC .............. *B26D 3/26* (2013.01); *A23L 19/03* (2016.08); *A23L 19/12* (2016.08); *A23L 19/18* (2016.08);
(Continued)

(58) Field of Classification Search
CPC .. B26D 3/26; B26D 1/0006; B26D 2001/006; A23L 19/18; A23L 19/12; A23L 19/03
See application file for complete search history.

(56) References Cited

U.S. PATENT DOCUMENTS

D81,273  S  *  6/1930  Etter ................ A23L 19/18
                                                        D1/120
2,612,453 A  *  9/1952  Bernhardt .......... A23L 19/18
                                                        426/143
(Continued)

FOREIGN PATENT DOCUMENTS

EP         1980151 A1   10/2008
GB          826166 A   12/1959
WO     02004/082400    9/2004

OTHER PUBLICATIONS

Extended European Search Report dated Nov. 19, 2015 in EP Application No. 12880013.
(Continued)

*Primary Examiner* — Sean M Michalski
(74) *Attorney, Agent, or Firm* — Panitch Schwarze Belisario & Nadel LLP

(57) ABSTRACT

A lattice-cut potato product is sliced so that the ridges (115) and grooves (122) on one surface of the slices are oriented transversely to the ridges (116) and grooves (124) on the opposite surface of the slices. The sizes and shapes of the ridges and grooves are particularly selected so that each point in the interior of a slice is no greater than a specified distance from an outer surface of the slice. These parameters enable a lattice-cut potato product to consistently achieve a crispy outer surface and a smooth and creamy interior when cooked by baking or microwaving.

11 Claims, 7 Drawing Sheets

(51) Int. Cl.
*A23L 19/18* (2016.01)
*B26D 1/03* (2006.01)
*B26D 7/06* (2006.01)
*A23L 19/12* (2016.01)
*B26D 1/00* (2006.01)

(52) U.S. Cl.
CPC ............. *B26D 1/0006* (2013.01); *B26D 1/03* (2013.01); *B26D 7/0691* (2013.01); *A23V 2002/00* (2013.01); *B26D 2001/006* (2013.01); *Y10T 83/9495* (2015.04)

(56) References Cited

U.S. PATENT DOCUMENTS

| | | | | |
|---|---|---|---|---|
| 2,961,024 | A * | 11/1960 | Urschel | B26D 1/03 83/403 |
| 3,139,127 | A | 6/1964 | Urschel et al. | |
| 3,139,130 | A | 6/1964 | Urschel | |
| 3,397,993 | A | 8/1968 | Strong | |
| 3,472,591 | A | 10/1969 | Frohlich | |
| 3,521,688 | A * | 7/1970 | Urschel | B26D 3/18 83/165 |
| 3,870,809 | A * | 3/1975 | Green | A23N 7/005 426/287 |
| 3,879,564 | A * | 4/1975 | Cocozzella | A21D 13/41 426/138 |
| 4,420,494 | A * | 12/1983 | Glantz | A23L 19/18 426/441 |
| 4,447,459 | A | 5/1984 | Balboni et al. | |
| 4,523,503 | A * | 6/1985 | Julian | B26D 1/03 83/403 |
| 4,579,743 | A * | 4/1986 | Hullah | A23L 19/18 426/262 |
| 4,584,931 | A * | 4/1986 | Feehan | A47J 37/044 426/438 |
| 4,590,080 | A | 5/1986 | Pinegar | |
| 4,604,925 | A * | 8/1986 | Wisdom | B26D 1/03 144/162.1 |
| 4,813,317 | A * | 3/1989 | Urschel | B26D 1/36 83/356.3 |
| 4,937,084 | A * | 6/1990 | Julian | B26D 1/03 426/144 |
| 5,095,875 | A * | 3/1992 | Morris | B26D 1/0006 83/403 |
| 5,555,787 | A * | 9/1996 | Barber | B23D 35/008 83/403 |
| 5,576,041 | A * | 11/1996 | Clow | A21C 11/06 425/294 |
| 5,694,824 | A * | 12/1997 | Jacko | B26D 1/03 83/403 |
| 6,001,411 | A * | 12/1999 | Kester | A23L 27/2024 426/321 |
| D569,160 | S * | 5/2008 | Mossbeck | B26D 1/03 D6/601 |
| 7,993,693 | B2 | 8/2011 | Bows et al. | |
| 8,714,068 | B2 * | 5/2014 | Ornelaz, Jr. | B26D 7/2614 83/403 |
| D723,244 | S * | 3/2015 | King | B26D 1/03 D1/128 |
| 2005/0042360 | A1 | 2/2005 | Tiffany et al. | |
| 2005/0266144 | A1 | 12/2005 | Hamann et al. | |
| 2008/0022822 | A1 * | 1/2008 | Jacko | B26D 1/03 83/403 |
| 2008/0026122 | A1 | 1/2008 | Bows et al. | |
| 2009/0202694 | A1 * | 8/2009 | Julian | B26D 1/38 426/506 |
| 2012/0111169 | A1 * | 5/2012 | Blalock | B26B 3/08 83/614 |
| 2014/0290451 | A1 * | 10/2014 | Jacko | B26D 7/2614 83/13 |
| 2016/0075047 | A1 * | 3/2016 | Bucks | B26D 7/0691 83/403 |

OTHER PUBLICATIONS

International Search Report and Written Opinion dated Nov. 5, 2012 in International Patent Appl. No. PCT/US12/45058.
Extended European Search Report for Application No. EP12880013 dated Nov. 12, 2015.
Office Action dated Feb. 15, 2016 in CA Application No. 2,877,930.
Int' Preliminary Report on Patentability dated Dec. 31, 2014 in Int'l Application No. PCT/US2012/045058.
Office Action dated Aug. 26, 2016 in U.S. Appl. No. 14/380,841.
Office Action dated Dec. 29, 2016 in U.S. Appl. No. 14/380,841.
Office Action dated May 27, 2019 in Indian Application No. 436/DELNP/2015.

* cited by examiner

BLADE ASSEMBLY AND METHOD OF MAKING CUT FOOD PRODUCTS

CROSS-REFERENCE TO RELATED APPLICATION

This application is a Divisional of U.S. patent application Ser. No. 14/380,841, filed Aug. 25, 2014, which is a Section 371 of International Application No. PCT/US2012/045058, filed Jun. 29, 2012, the disclosure of which is incorporated herein by reference.

FIELD OF THE INVENTION

The present invention is related to lattice or waffle cut vegetables, particularly potatoes, and to an apparatus for cutting same. More particularly, the invention is related to processed lattice cut or waffle cut potatoes that have a crispy texture following cooking. Still more particularly, the invention is related to lattice cut or waffle cut potatoes that achieve a crispy cooked texture without frying.

BACKGROUND OF THE INVENTION

The manufacture of French fries tends to follow a basic process of washing, peeling when desired, cutting, blanching in hot water or steam, drying, frying and freezing or chilling. This process, as disclosed in U.S. Pat. Nos. 3,397,993 and 3,472,591, was originally developed to provide French fries for the foodservice market. Corrugated or lattice-cut French fries have been produced by a similar process. Since that time, a trend has developed to live a healthier lifestyle. That trend has included a reduction in the consumption of fried foods. Acknowledging this trend, many restaurants and others in the foodservice industry have reduced or even eliminated their offering of fried foods. Despite this trend, there is still a strong demand in the foodservice industry for a crispy potato side dish. The foodservice industry has attempted to meet this demand with a thin lattice-cut French fry or chip that portrays an upscale image, and that can be cooked without frying, such as in an oven or by microwave.

The processes used today for manufacturing both ovenable and microwavable lattice-cut chips are derivatives of the existing frying processes. Despite the advantages these products may provide, chips cooked in an oven or by microwave have produced inferior results to those cooked by frying in oil. That is, chips that are fried in oil consistently have a crispy outer layer with a smooth and creamy interior. In contrast, it is difficult to consistently obtain a crispy surface texture on chips that are baked in a conventional oven or by microwave.

There therefore is a need for improved processed chips which can be baked in a conventional oven or in a microwave, but that will exhibit a crispy surface texture reminiscent of fried French fries on a consistent basis. In particular, there is a need for such products in a lattice-cut form.

BRIEF SUMMARY OF THE INVENTION

The present invention addresses these needs.

One aspect of the present invention provides a method of preparing a potato-based food product. The method includes cutting potatoes into slices having first and second major surfaces, the first surface having a plurality of ridges and grooves extending in a first direction, and the second surface having a plurality of ridges and grooves extending in a direction transverse to the first direction, the potato slices having an interior surrounded by an exterior surface, each point in the interior being no more than a predetermined distance from a point on the exterior surface. The potato slices may then be blanched, dipped in a solution to prevent nonenzymic oxidation of the potato slices, dried, parfried, and packaged. The plurality of ridges and grooves in the second surface may be substantially orthogonal to the plurality of ridges and grooves in the first surface.

The blanching step may include heating the potato slices in a water bath at a temperature of between about 150° F. and about 200° F., for a time between about 5 minutes and about 20 minutes.

The method may include additional steps. One additionally step is freezing of the potato slices. Another additional step is cooking the potato slices without frying. The cooking step may include heating by warm air, or heating by microwave energy. A further step may include preheating the potatoes to soften the potatoes prior to the cutting step.

The predetermined distance may be between about 0.055 inches and about 0.175 inches. Preferably, the predetermined distance is about 0.110 inches.

Each ridge may have a longitudinal peak, the peaks on the first surface being spaced from the peaks on the second surface by a peak-to-peak thickness measured in a direction substantially orthogonal to the first and second surfaces, the peak-to-peak thickness being between about 0.110 inches and about 0.350 inches. Preferably, the peak-to-peak thickness is about 0.220 inches.

The grooves on the first surface may intersect with the grooves on the second surface to define a plurality of openings extending through the slice.

Another aspect of the present invention is a lattice-cut potato product produced according to the foregoing methods.

Yet a further aspect of the present invention is a cutting blade for cutting potatoes. The cutting blade includes an elongated body having a cutting edge and opposed inner and outer sides, each side having a plurality of alternating longitudinal ridges and grooves extending substantially perpendicular to the cutting edge. Each ridge has a longitudinal peak, the peaks on the inner side being spaced from the peaks on the outer side by a peak-to-peak thickness measured in a direction substantially orthogonal to the first and second sides, the peak-to-peak thickness being between about 0.108 inches and about 0.118 inches. Preferably, the peak-to-peak thickness is about 0.113 inches. Each ridge and each groove may have a radius of curvature of about 0.100 inches.

In a preferred cutting blade, an interpeak distance between one peak on the inner side of the body and a next adjacent peak on the inner side of the body is between about 0.328 inches and about 0.380 inches. An interpeak distance of about 0.345 inches is more preferred.

Preferably, a ratio of the interpeak distance to the peak-to-peak thickness is between about 2.90 and about 3.36. More preferably, the ratio of the interpeak distance to the peak-to-peak thickness is between about 3.00 and about 3.20.

BRIEF DESCRIPTION OF THE DRAWINGS

A more complete appreciation of the subject matter of the present invention and the various advantages thereof can be realized by reference to the following detailed description, in which reference is made to the accompanying drawings in which.

DETAILED DESCRIPTION

Apparatus for making the lattice-cut product of the present invention is described in U.S. Pat. No. 3,139,130, the disclosure of which is hereby incorporated by reference herein. The apparatus may be used to slice substantially any firm food into a lattice configuration, but will be described herein in connection with cutting potatoes into corrugated or lattice-cut slices.

Figure 1:
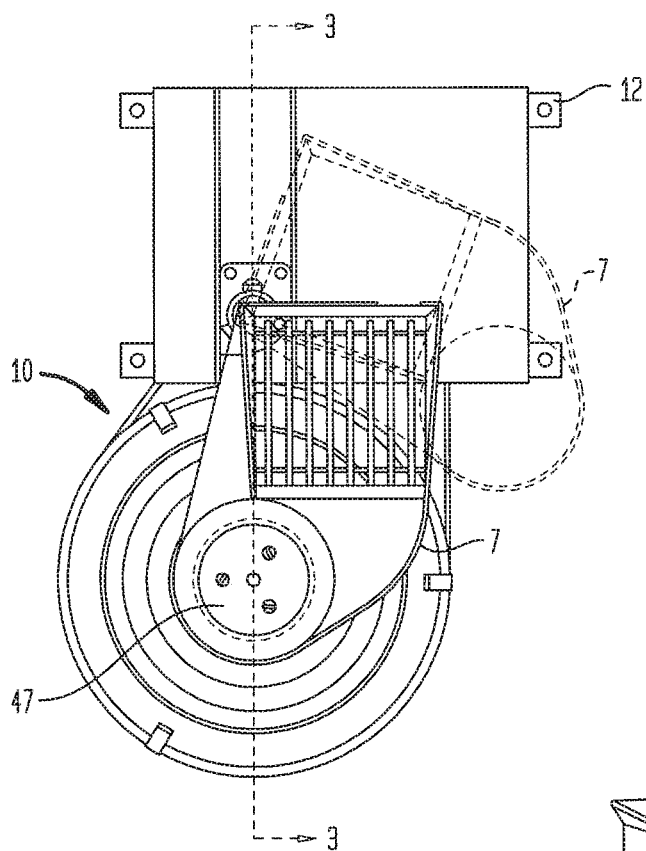
FIG. 1 is a top plan view of an apparatus for manufacturing a lattice-cut potato product according to the present invention.
Figure 2:
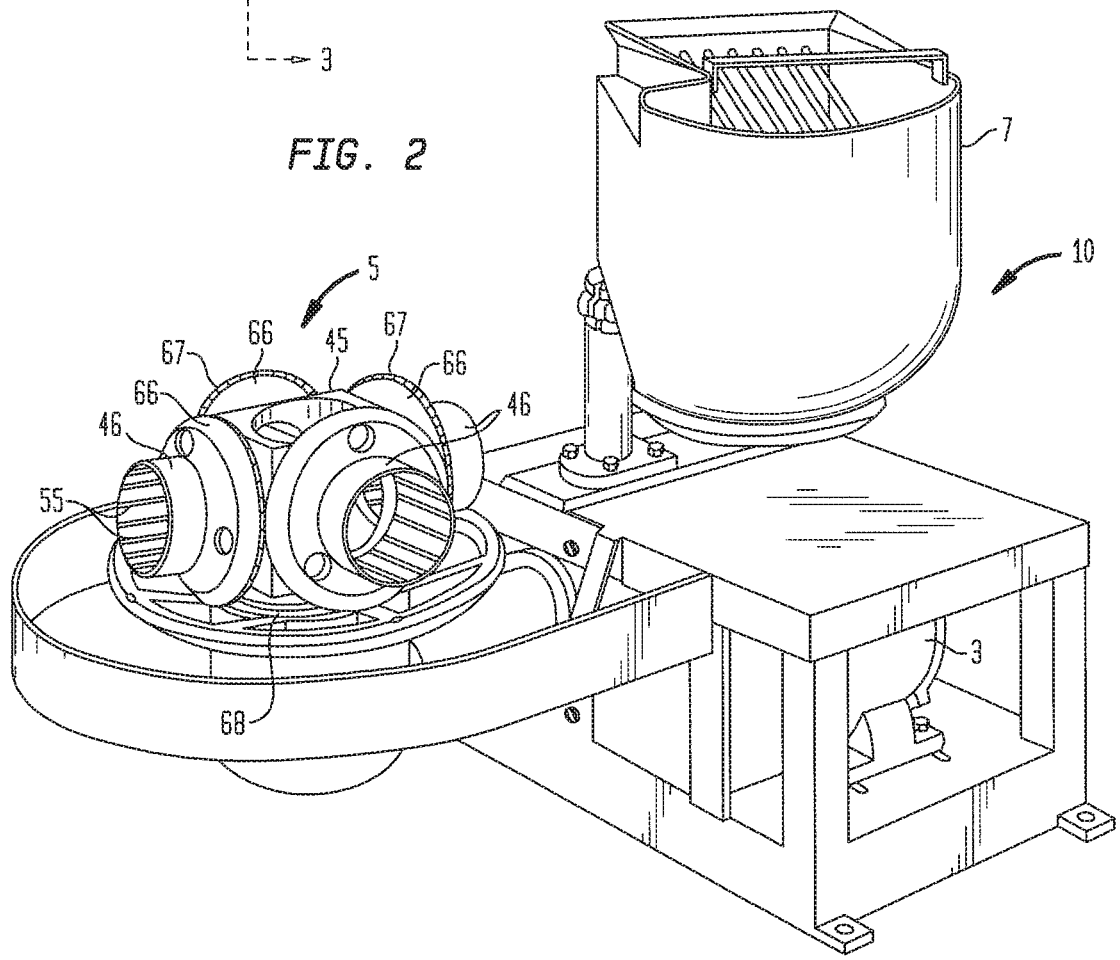
FIG. 2 is a perspective view of the apparatus of FIG. 1 with the cutter assembly and cover thereof removed and the hopper thereof disposed in an inoperative position.
Figure 3:
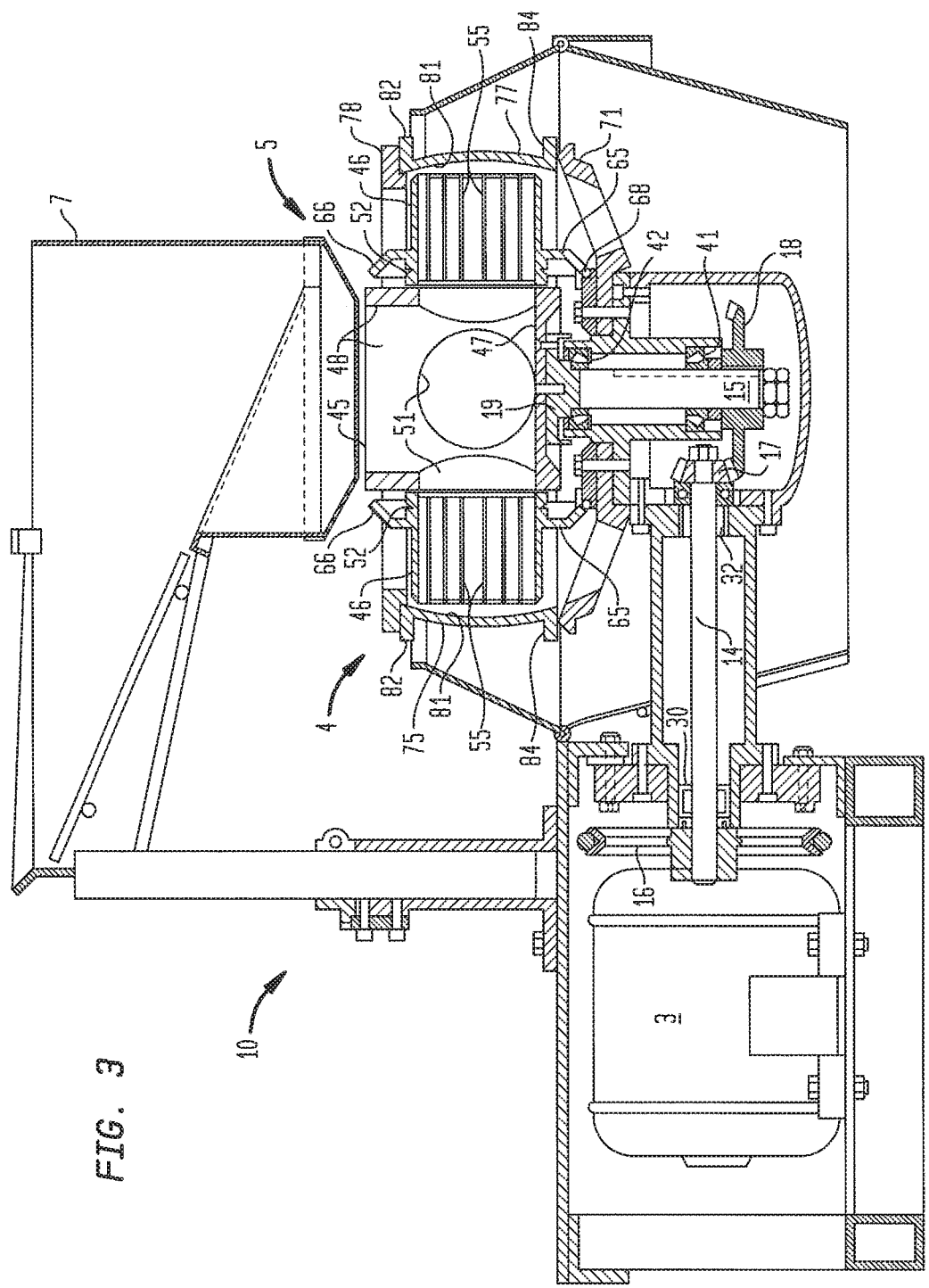
FIG. 3 is a vertical cross-sectional view taken along line 3-3 of FIG. 1.
Figure 4:
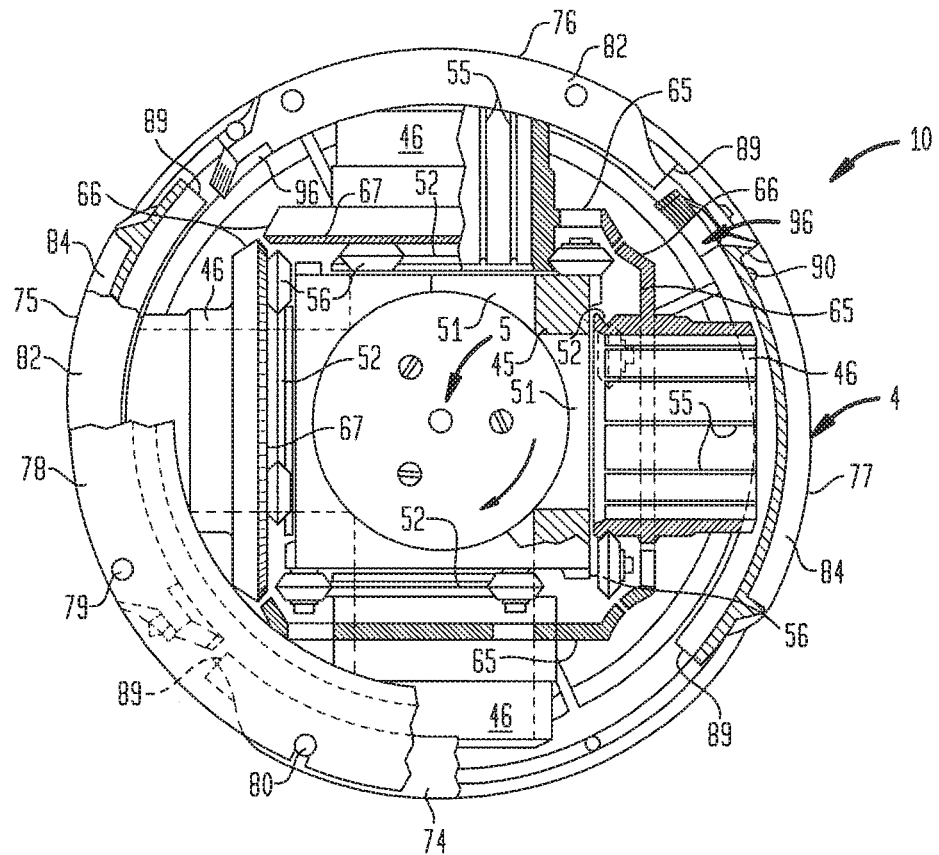
FIG. 4 is an enlarged plan view showing the operative relationship of the carriage and cutter assembly, with portions in cross-section and a portion of the structure removed to illustrate certain details thereof.
Figure 5:
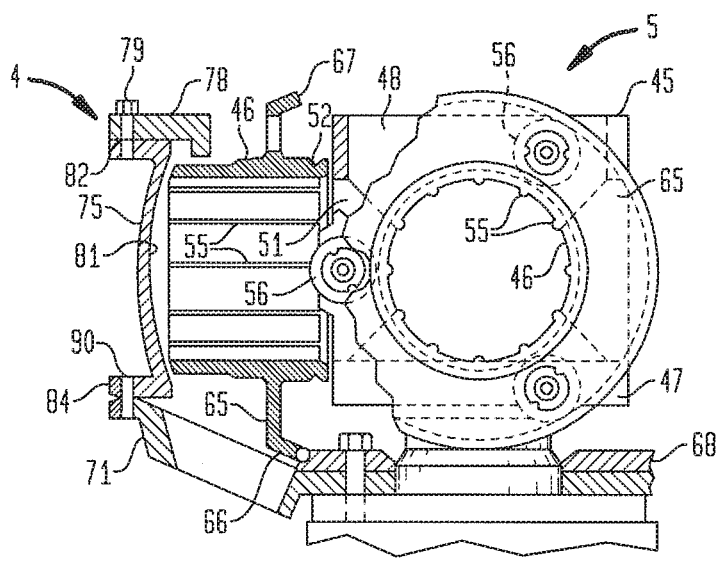
FIG. 5 is a partial vertical cross-section of the structure depicted in FIG. 4, with portions removed in order to illustrate other details of the structure.
Figure 6:
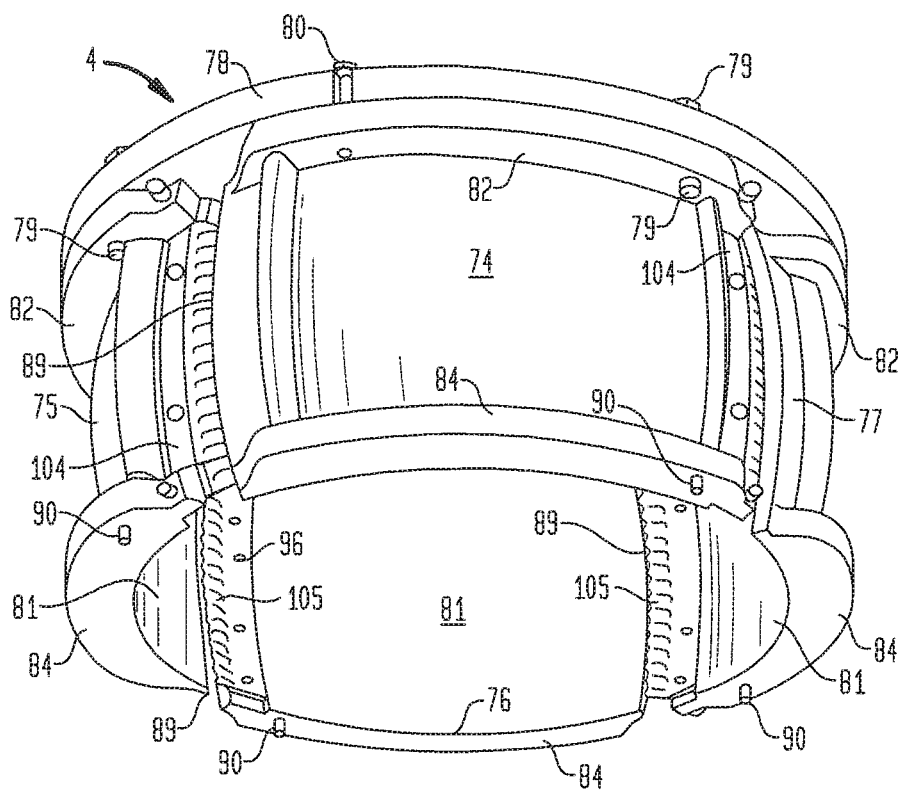
FIG. 6 is a bottom perspective view of the cutter assembly.
Figure 7:
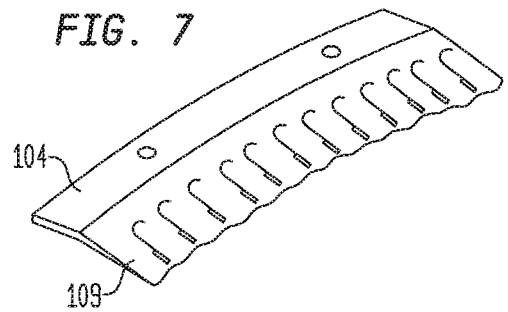
FIG. 7 is a perspective view of a knife clamp.
Figure 8:
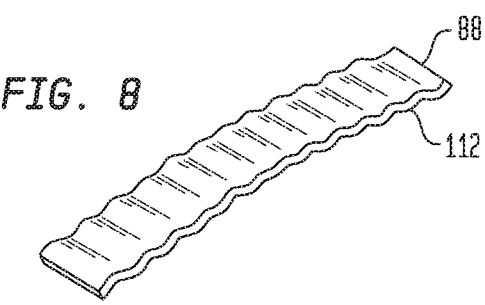
FIG. 8 is a perspective view of a knife.
Figure 9:
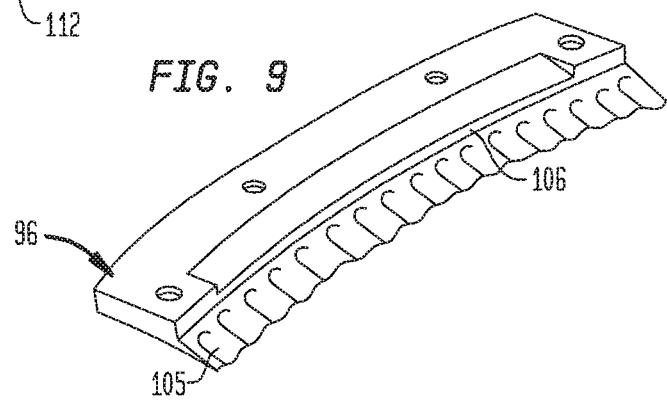
FIG. 9 is a perspective view of a knife holder.

Referring to FIGS. 1-3, the main components of an apparatus 10 for cutting potatoes into lattice-shaped slices generally include a motor 3, a stationary cutter assembly 4 supported by a frame, and a carriage assembly 5 disposed in the cutter assembly and rotatable relative to same. A conveyor (not shown) may be employed to feed the potatoes into a hopper 7 above carriage assembly 5. A pipe (not shown) may be located above apparatus 10 for continuously delivering a small stream of water into carriage 5 in order to free the carriage and the cutter assembly 4 from any accumulation of starch and promote the flow of the potato products therethrough.

Motor 3 may be operatively connected to rotatable carriage 5 by a drive shaft 14 and a vertical shaft 15 geared to the drive shaft. One end of drive shaft 14 may be rotatably supported by roller bearing assembly 30 and may be provided with a relatively large pulley 16 having a belt thereon which is driven from a smaller pulley (not shown) carried by the shaft of motor 3. The other end of drive shaft 14 may be rotatably supported by another roller bearing assembly 32, and may include a small spiral bevel gear 17 which meshes with a larger bevel gear 18 keyed to the lower end of vertical shaft 15. Vertical shaft 15 may be rotatably journaled at its lower end by roller bearing assembly 41 and at its upper end by roller bearing assembly 42. The upper end of vertical shaft 15 may be provided with an annular head 19 on which the carriage 5 is detachably secured.

The carriage 5 generally includes a vertically oriented receptacle 45 and four identical tubular guides 46 extending radially outward therefrom at substantially perpendicular angles to one another. Receptacle 45 includes a base wall 47 operatively connected to vertical shaft 15, and four vertical side walls 48. Receptacle 45 is open at its top for receiving potatoes from hopper 7 or by other means of introduction. A large circular opening 51 in each side wall 48 defines a passageway between receptacle 45 and the interior of a respective tubular guide 46.

Tubular guides 46 are mounted to receptacle 45 so as to be rotatable relative to the receptacle about their longitudinal axes. Each tubular guide 46 may be provided with a relatively large radial annular flange 65 with an annular portion 66 disposed at an oblique angle to the radial flange. The free edge of each portion 66 includes a plurality of teeth or serrations 67 which are adapted to engage a resilient ring 68 fixedly connected to the support structure of apparatus 10. As a result, when carriage 5 is rotated about its vertical axis, the engagement of teeth 67 against resilient ring 68 causes the tubular guides 46 to rotate about their own axes. In a preferred arrangement, the rotation of tubular guides 46 will cause the potatoes therein to rotate by about 90° about their own axes for each quarter turn of carriage assembly 5, as will be explained further below.

Each tubular guide 46 is preferably cylindrical, and includes an annular V-shaped exterior groove 52 adjacent its inner end which serves as a track for receiving three identical roller assemblies 56 secured at equally spaced positions to each side wall of receptacle 45. A plurality of circumferentially spaced longitudinally extending ridges 55 may be provided on the inner surface of each tubular guide 46 to assist in rolling or rotating the potatoes as they travel through the guide.

The cutter assembly 4 may include four curved elongated segments 74, 75, 76 and 77, each of which has an inner spheroidal surface 81, an upper horizontal outer flange 82, and a lower horizontal outer flange 84. Each of segments 74-77 is mounted to an upper annular support 78 by a screw 79, and to a lower annular support 71 by a pin 90 which is aligned with screw 79 so that each segment is able to pivot about a vertical axis. A curved cutting blade 88 is mounted to the free end of each segment, and the opposite end of each segment terminates in an edge 89. The thickness of the slices to be cut may be adjusted by pivoting one of the elongated segments relative to the next adjacent elongated segment so as to adjust the distance between the cutting blade 88 on the one segment and the terminal edge 89 on the adjacent segment. Once properly adjusted, screws 80 may be tightened to selectively lock the elongated segments in place.

Cutting blades 88 are clamped in place between a blade holder 96 and a clamp 104 mounted at the free end of each of elongated segments 74-77. More particularly, cutting blades 88 are held in place between a corrugated portion 105 of blade holder 96 and a corrugated portion 109 of clamp 104. In the assembled position, the corrugations of cutting blade 88 are nested or mated with the corrugated portions of the blade holder 96 and the corrugated portions of the clamp 104, with the cutting edge 112 of the cutting blade protruding outwardly therefrom by a predetermined amount. This amount is fixed by a locating shoulder 106 formed in blade holder 96 at a preset distance from the free edge of corrugated portion 105. Not only does shoulder 106 fix the amount of cutting blade 88 that protrudes from blade holder 96 and clamp 104, but it also supports the cutting blade and prevents it from being pushed backward as the cutting blade slices through the potatoes.

Figure 10:
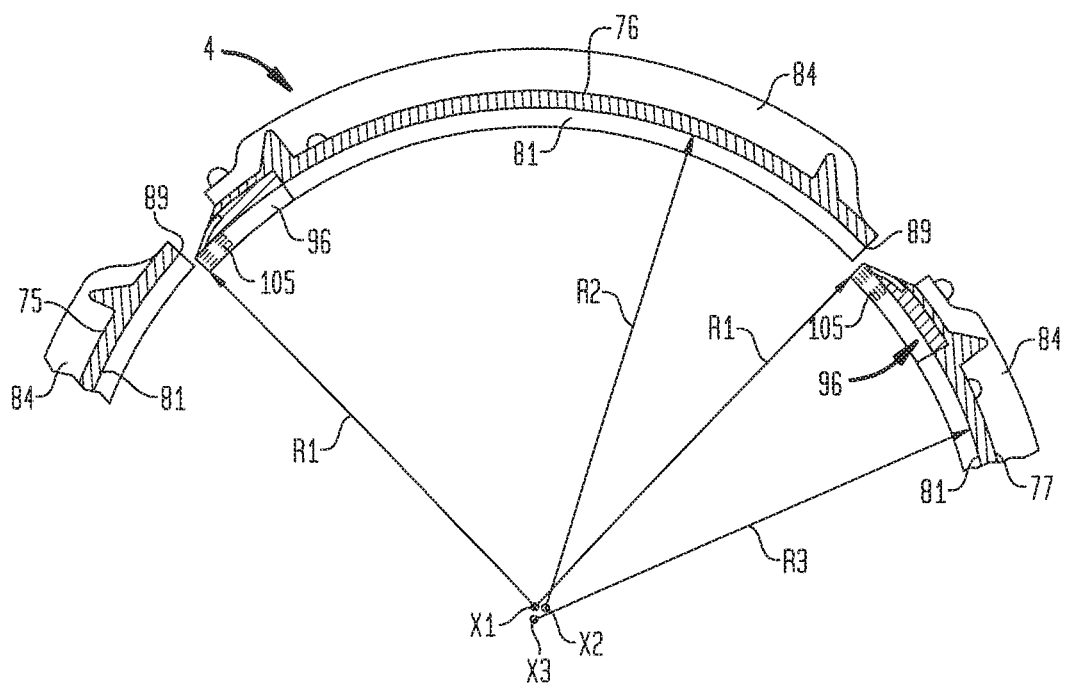
FIG. 10 is a partial horizontal cross-section of a cutter assembly exemplifying the relationship of the elongated segments with respect to one another and to the center of the assembly.

Referring to FIG. 10, the cutting edge 112 of each cutting blade 88 is located the same radial distance R1 from a point X1 constituting the longitudinal axis of the cutter assembly 4. The terminal edges 89 of elongated segments 74-77 are also all located the same radial distance from point X1, but at a greater distance than R1 due to the fact that the elongated segments have been pivoted in a horizontal plane to provide a discharge passage between the terminal edge 89 of one segment and the cutting blade 88 carried by an adjacent segment. In other words, elongated segments 74-77 have been adjusted so that, for example, the radial distance R2 from a center X2 to the spheroidal surface 81 of segment 76 is the same as the radial distance R3 from a center X3 to the spheroidal surface 81 of segment 77. Centers X2 and X3, as well as the centers for the radial distances to the spheroidal surfaces of segments 74 and 75, are equally spaced concentrically about the longitudinal axis X1 of cutter assembly 4.

The use of apparatus 10 for cutting a potato 113 will now be described with reference to the figures. As an initial step, the potatoes may be washed and peeled, except for those products in which it is desirable for the skin to remain on the potatoes. The potatoes may then be preheated to a temperature between about 90° F. and about 145° F. in a water bath for a time sufficient to slightly soften the potatoes, typically between about 15 minutes and about 45 minutes. This softening facilitates the slicing process, making it easier to obtain full slices of potato. Without this softening step, the potatoes are quite hard and are prone to fracturing before a slice has been completed.

After the preheating step, the potatoes may be fed into receptacle 45 from hopper 7 or any other feed mechanism. As apparatus 10 is operated, carriage 5 will rotate about its longitudinal axis, and each of tubular guides 46 will rotate about its respective longitudinal axis. The centrifugal force resulting from rotation of carriage 5 will automatically project the potatoes in receptacle 45 radially outward through one of the openings 51 in the receptacle and into the adjacent tubular guide 46. The rotation of tubular guides 46 along with the longitudinally extending ridges 55 therein cause the potato 113 to rotate about its own axis as it is being forced radially outward against the spheroidal surfaces 81 and cutting blades 88 of cutter assembly 4. As the cutting assembly 4 remains stationary, the rotation of the carriage assembly 5 will cause the tubular guide 46 to push a potato 113 therein toward and past the cutting blades 88, whereby a slice will be cut from the potato as it passes each of the cutting blades. Moreover, the rotation of tubular guides 46 will cause potato 113 to rotate between slices so that the corrugations on one surface of a slice will be transverse to the corrugations on the other side of the slice. Preferably, potato 113 will rotate about 90° (or a multiple thereof) about its axis for each 90° rotation of carriage assembly 5. In other words, potato 113 preferably will rotate about 90° between successive slices so that the corrugations on one surface of the potato slice will be substantially orthogonal to the corrugations on the opposite surface of the slice.

Figure 11:
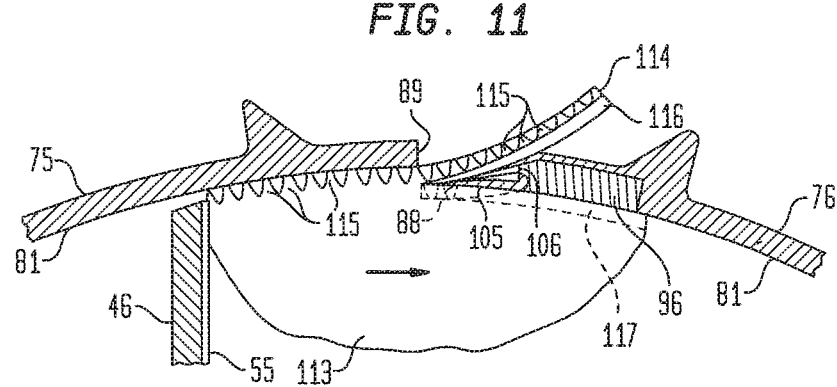
FIG. 11 is an enlarged partial horizontal cross-section of portions of the elongated segments and a portion of the carriage showing a product in the act of being cut into the lattice product of the present invention.

FIG. 11 shows cutting blades 88 cutting a slice 114 from potato 113. The slice has curved ridges 115 extending in a first direction on one side and curved ridges 116 extending in a second direction on its opposite side, the second direction being transverse to the first direction. Preferably, the first and second directions are substantially perpendicular to one another. More particularly, ridges 115 may have been formed as the cutting blade 88 on elongated segment 75 cut the potato 113, and after the potato has rotatably slid against the spheroidal surface 81 of segment 75, the cutting blade on the adjacent segment 76 cuts the potato to simultaneously form the ridges 116 on the severed potato slice 114 and the ridges 117 on the outer side of the remaining potato as indicated by the dotted lines. Thus, as the carriage 5 rotates relative to cutter assembly 4, the potato 113 will be sliced by cutting blades 88 on successive segments 74, 75, 76 and 77 until the entire potato has been exhausted.

Although the foregoing describes only a single potato 113 being rotated and cut within a guide tube 46, it will be appreciated that, depending upon the size of the potatoes, two or more potatoes may reside in a guide tube and be simultaneously forced against and sliced by cutting assembly 4. Moreover, it will be appreciated that, while one or more potatoes are being sliced by cutting assembly 4, other potatoes may be lined up behind them in tubular guide 46 to be sliced in succession.

Figure 12:
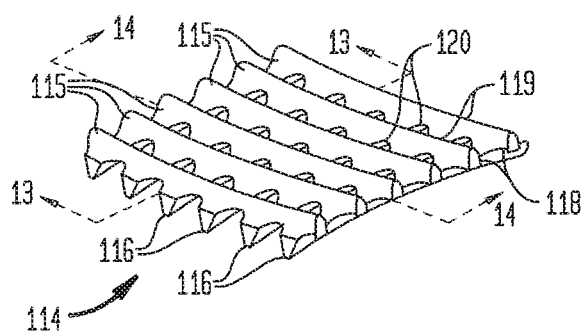
FIG. 12 is a perspective view of a portion of the lattice-cut product of the present invention.
Figure 13:
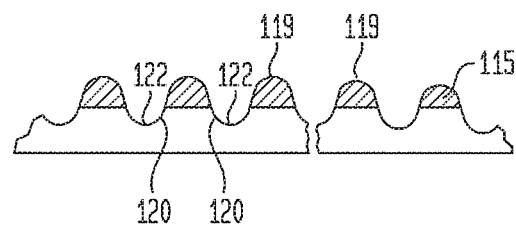
FIG. 13 is an enlarged cross-section taken along line 13-13 of FIG. 12.
Figure 14:
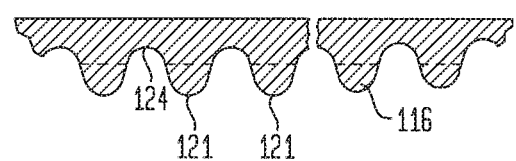
FIG. 14 is an enlarged cross-section taken along line 14-14 of FIG. 12.

FIG. 12 depicts a portion of the lattice-cut product produced by apparatus 10. Lattice-cut potatoes according to the present invention are generally in the form of a slice 114 having an ellipsoid outer periphery which would depend, to a large extent, on the shape of the potato being sliced. Each ridge 115 on one surface of slice 114 has a longitudinal peak 119 with a radius of curvature R of about 0.100 inches. Similar ridges 116 with longitudinal peaks 121 having a radius of curvature of about 0.100 inches are on the opposite surface of slice 114. A groove or channel 122 is formed between each pair of ridges 115, and a similar groove or channel 124 is formed between each pair of ridges 116 so that each surface of slice 114 is provided with alternating ridges and grooves.

The slices 114 may have a thickness from the peaks 119 on one surface of the slice to the peaks 121 on the other surface of the slice of between about 0.110 inches and about 0.350 inches measured in a direction substantially orthogonal to the first and second surfaces, with a thickness of about 0.220 inches being preferred. The thickness of the slice may be adjusted by adjusting the positions of elongated segments 74-77 of apparatus 10. When segments 74-77 are adjusted to produce a slice of appropriate thickness, the cutting blades 88 will cut to a predetermined depth so that the grooves formed on one surface of the slice will intersect with the grooves formed on the other surface of the slice to produce a multiplicity of openings 120 extending through the slice.

The lattice-cut potato products of the present invention produce a crispy outer surface and a creamy inner texture when cooked in warm air, such as in an oven, or when cooked by microwave. Without being held to any particular theory, it is believed that these desirable results are achieved as a result of the ratio of the total surface area of the potato slices to the mass of the potato in the slices. In other words, the combination of the ridges 115 and 116 on the potato slices, the grooves 122 and 124 on the potato slices, and the openings 120 extending through the potato slices provides each potato slice with a very large surface area. Controlling the maximum distance from any point in the interior of the potato slice to a point on the exterior surface will assure that any residual moisture in the potato has an opportunity to escape through the potato surface during cooking, thereby enabling the potato to cook evenly and completely while maintaining a crispy surface texture. Preferably, the maximum distance from a point in the interior of the potato slice to a point on the exterior surface of the potato slice is between about 0.055 inches and about 0.175 inches, with a maximum distance of about 0.110 inches being preferred.

Figure 15:
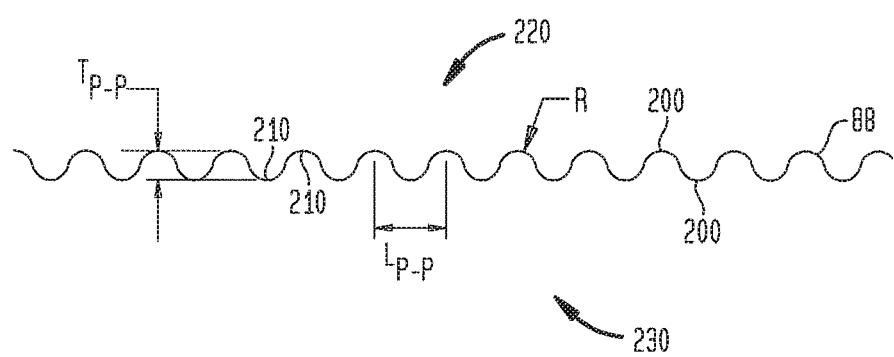
FIG. 15 is a schematic end view of a cutting blade for making the lattice-cut product of FIG. 12.

A schematic end view of a cutting blade 88 for producing a lattice-cut potato slice 114 as described above is shown in FIG. 15. The cutting blade has a generally sinusoidal configuration formed by alternating longitudinal ridges 200 and grooves 210 which extend substantially perpendicular to the cutting edge 112. The ridges 200 and grooves 210 have a radius of curvature R of about 0.100 inches. The peak-to-peak thickness $T_{p\text{-}p}$ between the ridges 200 on an inner side 220 of the blade and the ridges 200 on an outer side 230 of the blade is preferably between about 0.108 inches and about 0.118 inches, and the cycle length $L_{p\text{-}p}$ between the peak of one ridge 200 and the peak of the next adjacent ridge on the same side of the blade is preferably between about 0.328 inches and about 0.380 inches. A peak-to-peak thickness of about 0.113 inches and a cycle length of about 0.345 inches are highly preferred. Blades with a $T_{p\text{-}p}$ of about 0.113 inches and an $L_{p\text{-}p}$ of between about 0.328 inches and about 0.380 inches produce an $L_{p\text{-}p}/T_{p\text{-}p}$ ratio of between about 2.90 and about 3.36. In preferred cutting blades, the range in peak-to-peak thickness may be greater when the $L_{p\text{-}p}/T_{p\text{-}p}$ ratio is within a narrower range. Therefore, for cutting blades in which the peak-to-peak thickness is between about 0.108 and about 0.118 inches, the $L_{p\text{-}p}/T_{p\text{-}p}$ ratio is preferably between about 3.00 and about 3.20.

Figure 16:
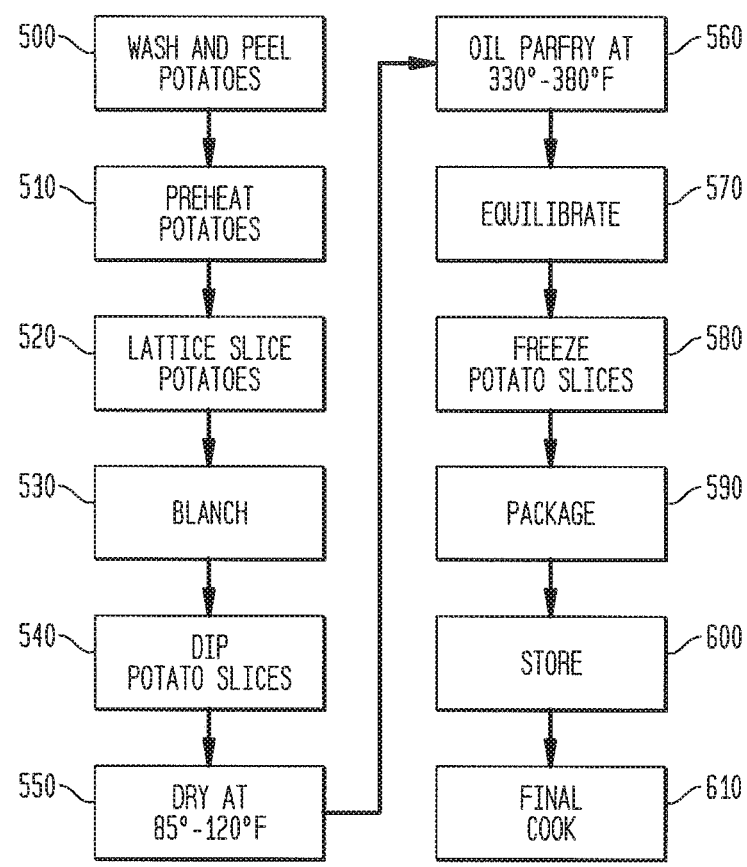
FIG. 16 is a flow diagram of the process steps involved in making a potato product according to the present invention.

Following cutting, the shaped potato slices 114 undergo a series of process steps prior to packaging. FIG. 16 depicts the entire process to which the potatoes may be subjected. Thus, after washing and (optionally) peeling at step 500, preheating at step 510, and slicing at step 520, all of which have been described above, the shaped potato slices 114 may be blanched at step 530 using a conventional processing technique. Such technique may include immersing the potato slices 114 in a water bath heated to between about 150° F. and about 200° F. for between about 5 minutes and about 20 minutes. It will be appreciated that the blanching time and temperature will be at least partially dependent on such factors as the potato variety and the size of the potato slices 114. Other blanching techniques may be used, such as deluge blanching, steam blanching and the like.

As shown at step 540, the blanched potato slices 114 may then be dipped in a solution containing about 0.5-1.5 wt % sodium acid pyrophosphate, 0-1 wt % dextrose, 0.5-1 wt % salt, and/or other ingredients as desired. The solution may be at a temperature of about 150° F., and the slices may be dipped for about 60 seconds. As is conventional in the art, the sodium acid pyrophosphate prevents nonenzymic oxidation of the potato slices; the dextrose facilitates browning on cooking; and the salt enhances the flavor of the final product. It will be appreciated by those skilled in the art that some of the foregoing ingredients may be omitted from the solution, or may be replaced by different ingredients that perform the same or similar functions.

Following the dipping process, the potato slices 114 are dried at step 550. Preferably, the drying step occurs in an elevated temperature environment, such as a forced air dryer. The elevated temperature may be between about 85° F. and about 120° F. for a period of about 10 minutes to about 14 minutes.

The dried potato slices 114 are then parfried at step 560 to achieve a total solids content of between about 48 wt % and about 68 wt %. The temperature of the oil in the parfrying step is preferably between about 330° F. and about 400° F. Following parfrying, excess oil optionally may be removed from the surface of the potato slices using an Oil Miser® oil recovery system available from Reyco Systems, Inc., of Caldwell, Id. Such step ensures a uniform oil content among the potato slices. The potato slices may then be equilibrated at step 570. Equilibration may take place at a temperature of between about 70° F. and about 110° F. for about 1 minute to remove residual heat and moisture from potato slices 114.

The equilibrated potato slices 114 may be frozen in a conventional manner at step 580. Freezing may be effected by a spiral freezer or any other conventional freezing apparatus known in the art. The frozen potato slices may be packaged at step 590 and stored in freezers at step 600.

The final cooking of the potato slices may be performed by a customer in the foodservice trade or by a retail customer at step 610. Cooking may be accomplished in a number of ways, but the preferred method does not involve frying in oil. In one cooking method, the frozen potato slices 114 may be spread on an oven-safe sheet or other container and baked in a hot air environment, such as an oven. In a preferred baking method, the potato slices may be heated in a conventional oven at between about 350° F. and about 450° F. for between about 2 minutes and about minutes. Cooking at about 425° F. for about 3.5 minutes is particularly preferred. Cooking may also take place in a convection oven. In such event, the cooking temperature may be about the same as in a conventional oven, but the cooking time may be between about 1 minute and about 4 minutes, with a cooking time of about 2.5 minutes being preferred.

The frozen potato slices 114 may also be cooked using microwave energy. A microwave cooking process may include spreading about 4 oz. of the frozen potato slices 114 on a microwave-safe plate or other container, and subjecting the slices to 1000 watts of microwave energy for about 75 seconds.

A still further cooking method may include a combination of hot air and microwave energy. This method may include heating the potato slices in a Turbochef® oven (available from Turbochef Technologies, Inc. of Carrollton, Tex.) at a temperature of about 1150° F. for between about 20 seconds and about 30 seconds using both hot air and microwave energy.

While the foregoing process includes the step of freezing the potato slices prior to packaging, this step is not required. Thus, there may be applications in which the potato products are simply refrigerated after the equilibration step, and stored in a refrigerated state. Particularly for retail consumers, refrigerated products may convey the image of a fresher, healthier product.

Although the invention herein has been described with reference to particular embodiments, it is to be understood that these embodiments are merely illustrative of the principles and applications of the present application. It is therefore to be understood that numerous modifications may be made to the illustrative embodiments and that other arrangements may be devised without departing from the spirit and scope of the present invention.

The invention claimed is:

1. A method of preparing a potato-based food product, the method comprising:
    cutting potatoes into slices having first and second major surfaces, the first surface having a plurality of ridges and grooves extending in a first direction, and the second surface having a plurality of ridges and grooves extending in a direction transverse to the first direction, the potato slices having an interior surrounded by an exterior surface, each point in the interior being no more than a predetermined distance from a point on the exterior surface;

blanching the potato slices;

dipping the blanched potato slices in a solution to prevent nonenzymic oxidation of the potato slices;

drying the potato slices;

parfrying the potato slices;

packaging the parfried potato slices; and cooking the parfried potato slices without frying, thereby obtaining a cooked potato product having a crispy outer layer and a creamy interior, wherein each ridge has a longitudinal peak, wherein a ratio of a distance between the peak of one ridge on the first surface and the peak of a next adjacent ridge on the first surface to the depth of the groves on the first surface is between about 2.90 and about 3.36; and wherein the predetermined distance is between about 0.055 inches and about 0.175 inches.

2. The method as claimed in claim 1, wherein the plurality of ridges and grooves in the second surface are substantially orthogonal to the plurality of ridges and grooves in the first surface.

3. The method as claimed in claim 1, wherein the blanching step includes heating the potato slices in a water bath at a temperature between about 150° F. and about 200° F., for a time between about 5 minutes and about 20 minutes.

4. The method as claimed in claim 1, further comprising freezing the potato slices.

5. The method as claimed in claim 1, wherein the cooking step includes heating by warm air.

6. The method as claimed in claim 1, wherein the cooking step includes heating by microwave energy.

7. The method as claimed in claim 1, further comprising preheating the potatoes to soften the potatoes prior to the cutting step.

8. The method as claimed in claim 1, wherein the predetermined distance is about 0.110 inches.

9. The method as claimed in claim 1, wherein the peaks on the first surface are spaced from the peaks on the second surface by a peak-to-peak thickness measured in a direction substantially orthogonal to the first and second surfaces, the peak-to-peak thickness being between about 0.110 inches and about 0.350 inches.

10. The method as claimed in claim 9, wherein the peak-to-peak thickness is about 0.220 inches.

11. The method as claimed in claim 1, wherein the grooves on the first surface intersect with the grooves on the second surface to define a plurality of openings extending through the slice.

* * * * *